Patented Aug. 6, 1946

2,405,275

UNITED STATES PATENT OFFICE 2,405,275

PURIFICATION OF ALUMINUM HYDRATE

Vernon Monroe Stowe, Collinsville, Ill., assignor to Aluminum Company of America, Pittsburgh, Pa., a corporation of Pennsylvania No Drawing. Application February 19, 1944, Serial No. 523,101

3 Claims. (Cl. 23—141)

This invention relates to the removal of impurities from alumina-bearing material, and relates particularly to the production of alumina of low soda content.

Aluminum hydrate frequently contains small amounts of a sodium compound or compounds—usually calculated and referred to as soda ($Na_2O$)—as a result of the method used to produce it. For example, aluminum hydrate is principally produced in this country by the well known Bayer process, which involves precipitation of the hydrate from a sodium aluminate solution, and the precipitated material contains soda values equal to about 1.5–2.0 per cent by weight of the alumina values. A portion of such soda can be removed by washing with water, but even after extensive washing, sufficient soda remains that upon calcination of the aluminum hydrate to drive off combined water and produce alumina, the calcined material contains soda in amounts which are considered objectionable in a number of uses to which the alumina is put, such as the use of alumina in producing certain ceramic articles, or as a catalyst or catalyst support in hydrocarbon conversion processes.

It is an object of this invention to provide a method of treating aluminum hydrate containing soda to produce alumina of low soda content therefrom, and it is a further object of the invention to provide such a method which is economical to use and does not leave objectionable materials in the alumina.

In carrying out the invention aluminum hydrate particles, after being washed to remove such soda as is easily removed by washing, are subjected to a succession of calcining operations, and after each of these calcinations the particles are leached. In the leaching, sodium values are removed. The process is so conducted that in one of the calcining operations chemically combined water is driven off from the particles, but the entire water content of the particles is not eliminated. After being washed or leached, the particles are further calcined sufficiently that the total water content thereof is lower than the water content of the particles at the end of the preceding calcination. The resulting material is then leached again.

Preferably in the second calcination mentioned only a part of the remaining water content of the particles is driven off, for the more nearly anhydrous the particles are, the more difficult it is to remove soda from them by leaching. Consequently, if it is desired to produce a final material which is anhydrous or which has only a small total water content, it is advantageous to produce such a water content by a final calcination after successive cycles of calcination and leaching as described above, rather than by calcining the particles to such a water content in the second calcining operation mentioned. The term "alumina" will be used herein to refer to the product produced by the successive cycles of calcination and leaching, regardless of whether the particles still contain some chemically combined water or are completely anhydrous.

Water alone, or various solutions, may be used in carrying out the leaching operations, the particular liquid or liquids employed depending to some extent on the characteristics desired in the final product. Soda can be removed sufficiently effectively for many purposes by merely using water in leaching the material being treated. Somewhat greater freedom from soda can be effected by employing at least one leach with a dilute solution of an acid, such as hydrochloric, sulfuric, nitric, acetic, oxalic or formic acid, in which case the particles should ordinarily be treated to remove acid ions from them after such a leach. In some instances sufficient freedom of the particles from the acid ions can be attained by washing the particles with water after the treatment with acid. However, the presence of even small amounts of acid ions in the particles is sometimes considered objectionable, as when they are used as a catalyst or catalyst support in hydrocarbon conversion processes, as disclosed in copending application Serial No. 555,406; likewise, when agglomerates of the types mentioned hereinafter are treated in accordance with the invention, such acid ions have a deleterious effect on the agglomerates' final strength and on their resistance to erosion of particles therefrom if present during calcination. Acid ions can be removed by leaching the particles with an alkaline solution, such as a lime, ammonia, sodium hydroxide, sodium carbonate, or sodium bicarbonate solution, subsequent to the leach with the acid, though preferably after first washing out as much acidic material as possible with water. The alkaline material can then be washed from the particles with water.

If nitric acid or one of the organic acids mentioned is the leaching acid used, acid ions left in the material treated can also be volatilized readily in a subsequent calcining operation, such as the second calcination described previously, although for best results it is desirable to wash out as much of the acid with water as possible before such calcination.

The calcination operations may be carried out in any manner which most economically drives off water from the particles to the desired content. The temperatures and length of time which may be employed to drive off water from aluminum hydrate particles to any particular content are well known. Preferably the initial calcination is effected at a relatively low temperature, such as 550–750° F., and the subsequent calcination is carried out at a higher temperature than that employed in the previous calcining step, in order to secure a lower water content in the particles conveniently. It is preferred that in the initial calcination sufficient water be driven off that the calcined particles contain about 8 to 20 per cent by weight of water values, and that after the particles have been leached as described above, they be calcined again until they contain only about half of the amount of water present at the end of the initial calcination, and then be further leached. The particles of aluminum hydrate treated in accordance with this invention may be in the form of separate, individual bodies, or they may be in the form of agglomerated masses of particles produced as described in U. S. Patent No. 2,352,867, or produced as scale on the walls of precipitation tanks during the precipitation of aluminum hydrate from sodium aluminate solution by the Bayer process.

The following considerations may explain the mechanism of the invention, but the explanation is theoretical and is not intended to limit the appended claims. When aluminum hydrate is calcined at a sufficiently high temperature to cause it to lose water of composition, the loss of such water opens up corridors or passages which permit leach liquid to reach the interior of the individual particles and remove soda. However, such calcination also tends to cause soda values to be more firmly held by the particles, and such is the case to an increasing extent as the degree of calcination is increased, although whether this effect is due to a strong chemical sorption of ions, or to the formation of complex insoluble compounds, or to other causes, is not known. Consequently, it is desirable to remove soda by washing before any calcination is effected, and to wash out additional soda after only partial calcination at a relatively low temperature. In carrying out this invention the first calcination opens up corridors in the particles sufficiently to permit access of leach liquid to the interior of the particles, but the above-mentioned effect of calcination on the soda content is restricted because of the limited nature of the calcination. Soda is then leached out. The second calcination drives off additional water from the particles, and although it increases the tenacity with which the remaining soda is held, it also opens up additional corridors for soda removal by leaching. The effectiveness of acids in the leaching operation may be due, at least in part, to the fact that acids enlarge the corridors opened up by calcination; moreover, they may cause a base exchange in which sodium ions are replaced by innocuous hydrogen ions. Surprisingly enough, when solutions of sodium hydroxide, sodium carbonate or sodium bicarbonate are used to remove acid ions left in the particles by an acid leach, little or no soda values from such solutions are retained when the particles are subsequently washed with water.

The manner of carrying out the invention, and the results obtainable, are indicated in the following examples, though the examples are given by way of illustration only, and the invention can be carried out in other ways within the scope of the appended claims.

Aluminum trihydrate scale produced on the walls of tanks used in the precipitation of aluminum trihydrate by the Bayer process, and containing soda equal to about 1.5 per cent of the weight of the alumina values of the aluminum trihydrate, was washed thoroughly with hot water. It was then calcined at 570° F. until the loss on ignition of the various particles ranged between about 10 and 20 per cent by weight. The calcined material was then allowed to stand in a 4 per cent solution of hydrochloric acid at 180° F. for about 5 hours, after which it was leached with water at 180° F. seven times by allowing it to stand in the water for 2 hours and then draining off the water. It was next calcined at 750° F. to a loss on ignition of the particles ranging from 5 to 10 per cent by weight, and was then leached with a 5 per cent sodium bicarbonate solution at 180° F. by allowing it to stand in the solution for 5 hours, and then draining off the solution. It was thereafter washed seven times in water in the manner described above, and calcined at 1000° F. to an average loss on ignition of 3.3 per cent by weight. The resulting material contained soda equal to only 0.05 per cent by weight of the alumina values, and contained 0.03 per cent by weight of chloride ions.

As a second example, aluminum trihydrate similar to that described in the preceding paragraph was treated in the same manner, except that it was not leached with a sodium bicarbonate solution after the second calcination. The product contained soda equal to 0.03 per cent by weight of the alumina values, but contained 0.74 per cent by weight of chloride ions.

I claim:

1. The process of producing alumina of low soda content from particles of aluminum hydrate containing soda comprising the steps of calcining the particles of aluminum hydrate sufficiently to remove only a part of the chemically combined water therefrom, subsequently leaching the resulting particles with a liquid capable of removing sodium values therefrom, thereafter calcining said particles sufficiently that the total water content thereof is lower than the water content of the particles at the end of said first mentioned calcination, and subsequently leaching the resulting particles with a liquid capable of removing sodium values therefrom.

2. The process of producing alumina of low soda content from particles of aluminum hydrate containing soda comprising the steps of calcining the particles of aluminum hydrate sufficiently to remove only a part of the chemically combined water therefrom, subsequently leaching the resulting particles with a liquid capable of removing sodium values therefrom, thereafter calcining said particles, at a temperature higher than that employed in said first mentioned calcination, sufficiently that the total water content thereof is lower than the water content of the particles at the end of said first mentioned calcination, and subsequently leaching the resulting particles with a liquid capable of removing sodium values therefrom.

3. The process of producing alumina of low soda content from particles of aluminum hydrate containing soda comprising the steps of calcining the particles of aluminum hydrate sufficiently to remove only a part of the chemically combined water therefrom, subsequently leaching the resulting particles with a liquid capable of removing sodium values therefrom, thereafter calcining said particles sufficiently to remove only a part of the remaining water content thereof, subsequently leaching the resulting particles with a liquid capable of removing sodium values therefrom, and thereafter calcining such particles sufficiently to remove remaining chemically combined water therefrom.

VERNON MONROE STOWE.